350-374 SR

XR 3,611,405

United States Patent [11] 3,611,405

[72] Inventor David C. Chang, Pleasant Valley, N.Y.
[21] Appl. No. 874,170
[22] Filed Nov. 5, 1969
[45] Patented Oct. 5, 1971
[73] Assignee International Business Machines Corporation, Armonk, N.Y.

[54] FUNCTIONAL CHECKING OF AN OPTICAL CHANNEL
4 Claims, 3 Drawing Figs.

[52] U.S. Cl. ........ 346/1, 346/108, 350/157
[51] Int. Cl. ........ G01d 18/00
[50] Field of Search ........ 346/76 L, 108, 1; 331/94.5; 356/201; 95/4.5; 250/205; 179/100.3 N; 350/150, 157

[56] References Cited

UNITED STATES PATENTS

| | | | |
|---|---|---|---|
| 2,274,530 | 2/1942 | Collins | 179/100.3 |
| 2,297,450 | 9/1942 | Becker | 179/100.3 |
| 3,220,013 | 11/1965 | Harris | 346/107 |
| 3,386,358 | 6/1968 | Kropp | 95/10 |

FOREIGN PATENTS

| | | | |
|---|---|---|---|
| 1,147,531 | 4/1969 | Great Britain | 346/76 |

OTHER REFERENCES

Chang, D. C. and Lipp, J.; Nonimpact Printer; IBM Technical Disclosure Bulletin; Vol. 12, No. 3, August 1969, page 419.

*Primary Examiner*—Joseph W. Hartary
*Attorneys*—Hanifin and Jancin and John F. Osterndorf

ABSTRACT: An arrangement for functionally checking the optical channel of an optical beam projection system. When the projection system is a recording system, immediate detection of a malfunction in the elements of the channel is accomplished by monitoring the intensity of the projected light beam.

3611405

PATENTED OCT 5 1971 3,611,405

INVENTOR
DAVID C. CHANG

BY John F. Ostendorf

ATTORNEY

FUNCTIONAL CHECKING OF AN OPTICAL CHANNEL

BACKGROUND OF THE INVENTION

1. Field of the Invention

This invention relates to an arrangement for detecting malfunctions in an optical beam projection system and, more particularly, to the method and apparatus for functionally checking the elements of an optical recording channel of such a system.

2. Description of the Prior Art

In optical beam-recording systems, there is usually a deflection system for positioning a light beam at a desired location on a target record medium. A modulator may be included in the system for controlling the intensity of the light beam. Such systems operate under computer control in accomplishing the recording on the medium and may be provided with a display terminal to give a real time indication of the information as it is recorded on the record medium. A system of this type is described and claimed in Application Ser. No. 874,172, filed the same day as this application in the names of Richard O. Cobb and James Lipp, entitled "Optical Information Recording Process and System" and assigned to the same assignee as this invention.

In recording systems of this type, provision must be made for functionally checking the elements of the system, that is, the light beam source, the light controls and the deflection system. To insure against the loss of system time or light energy the checking should be performed during the nonrecording system operation. With this type of checking it is possible to prevent the generation of masses of false records.

SUMMARY OF THE INVENTION

A method and apparatus are described for functionally checking the optical channel of such a recording system during the nonrecording mode of system operation. According to one feature of the invention, when the light beam source, its controls and the beam deflection arrangement are in a predetermined state of operation, means are operative to deflect at least a portion of the light from the optical channel and to prevent the passage of the remainder of the beam. The intensity of the deflected beam is monitored and compared against a predetermined intensity level to provide an indication of an error or malfunction in the channel or to provide a signal for correcting for an error.

According to another feature of the invention, the presence of any malfunction in the light beam deflection arrangement may be isolated by operating the arrangement in a second predetermined state of operation. A second monitoring device then provides an error indication when the intensity level of the light beam falls below the predetermined value.

DESCRIPTION OF THE PREFERRED EMBODIMENT

Figure 1:
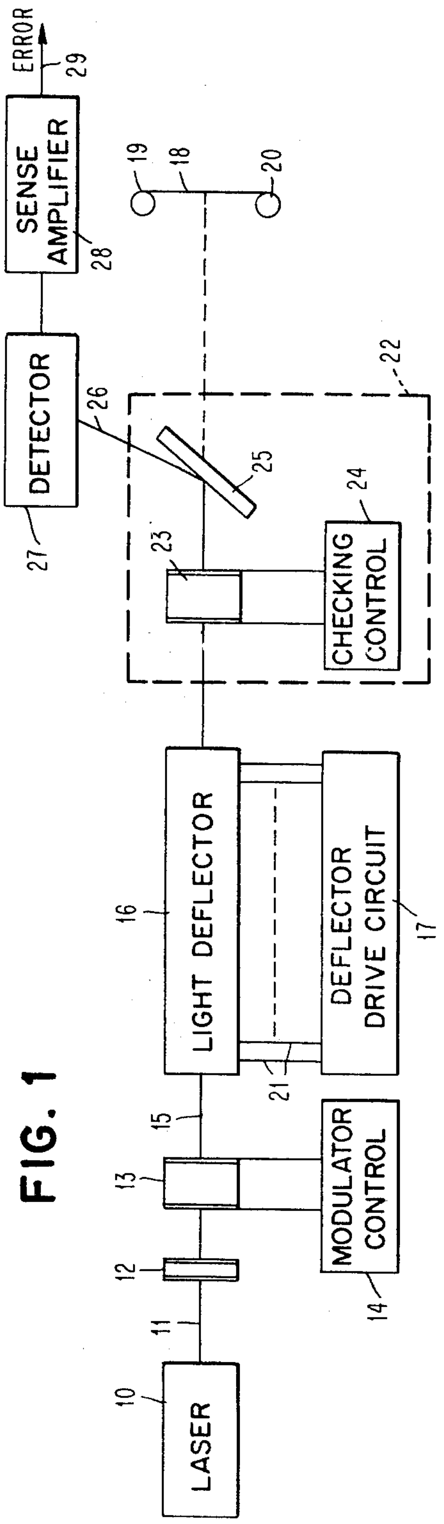
FIG. 1 is a schematic diagram of the optical channel and functional checking apparatus according to the invention.

Referring now to FIG. 1, the optical channel of the recording system is formed of a light source which may be a suitable laser 10, a modulator 13, light deflection system 16 and record medium 18.

Beam 11 is provided by laser 10 and has its polarization corrected to a predetermined linear direction by half wave plate 12. The linear polarization direction of beam 11 is preferably the vertical direction or the horizontal direction. After orientation of its polarization, beam 11 is provided to modulator 13 which may take the form of an electro-optic device operable under suitable modulator controls 14. Device 13 may be an electro-optic crystal of the type described hereinafter and having transparent electrodes fixed to its faces. Modulator 13 acts as a shutter to provide light of a predetermined intensity level in beam 15 or it prevents the transmission of light dependent on the control exercised by circuits 14. As light-modulating arrangements of this type are well known in the art, it is not considered to be necessary to describe it any further.

Beam 15 is provided to multistage light deflection system 16. Deflector 16 is operative in response to electrical signals provided by suitable deflector drive circuits 17 during the recording mode of system operation to position the beam 15 at any desired location on record medium 18.

Record medium 18 may be a photographic recording emulsion in roll form that is accessible a frame at a time as it is moved between rollers 19 and 20.

The light deflector is a plural stage arrangement of light-deflecting stages. Each stage is formed of a suitable light beam polarization control device and a light beam deflecting arrangement. The light deflector may be formed of any one or a combination of the types described in Applications Ser. Nos. 285,832 (now U.S. Pat. No. 3,499,700); 516,367 (now U.S. Pat. No. 3,481,661) and 814,240; filed respectively June 5, 1963; Dec. 27, 1965; and Apr. 7, 1969; in the names of Harris et al.; Harris; and Habegger et al. All of these applications have been assigned to the same assignee as this invention.

For purposes of this description, each stage of the plural stage light deflection system may be considered to include an electro-optic polarization control device and a birefringent deflecting device. The electro-optic devices may be formed of potassium dideuterium phosphate (KDP) crystals having transparent electrodes affixed to its faces. The birefringent devices may be calcite crystals.

To accomplish the deflection of the light beam, electrical signals are selectively applied through the lines 21 to the transparent electrodes of the electro-optic devices. The drive circuits may be of the type described in Application Ser. No. 653,571, filed June 14, 1967 now U.S. Pat. No. 3,492,502 issued Jan. 27, 1970 in the name of David C. Chang, and entitled "Bidirectional Capacitive Load Driver." This application has been assigned to the same assignee as this invention. The deflector drive circuits 17 may be operated in response to suitable control signals provided from a computer.

When a particular electro-optic device is in a deactivated state it does not effect any change in the polarization of the light beam incident on it. As a result, the light beam follows a first predetermined path through the birefringent device. When the electro-optic device has a voltage applied across it corresponding to the half wave voltage for that type of crystal, it effects a 90° rotation of the light beam's polarization such that when the beam is incident on the following birefringent device, it is caused to follow a second predetermined path through the birefringent device. The principles of operation of such light deflection systems are described in detail in the aforecited applications.

In the recording mode of operation light deflector 16 directs the light beam to a predetermined location on recording medium 18. The checking control arrangement indicated in broken line block form at 22 is in a deactivated state. It has no effect on the light beam provided at the output of deflector 16. To accomplish the functional checking of the optical channel, particularly when the record medium 18 is in the film pull-down time, that is, when recording is not taking place, the checking control arrangement 22 is activated.

Control arrangement 22 is formed of an electro-optic device 23 having suitable transparent electrodes affixed to it and responsive to a checking control drive circuit 24. Following electro-optic device 23 in the path of the incoming beam of light is a suitable birefringent device such as a calcite crystal 25. To accomplish the checking, the system is placed in an all "1"'s condition, that is, modulator control 14 is activated, all of the deflector drive circuits 17 are activated, and checking control circuit 24 is activated. The light beam provided at the output of deflector 16 has its polarization oriented by device 23 to a direction such that when incident on device 25 it is deflected as beam 26 out of the optical channel. Birefringent device 25 also prevents any part of the light beam incident on it from passing in the path to record medium 18.

A single light-detecting diode is provided as a detector 27 for monitoring beam 26. Detector 27 provides an electrical signal indicative of the intensity of beam 26 to sense amplifier 28. Amplifier 28 is adjusted for response to a predetermined level of light.

If the actual intensity level of light beam 26 falls below this predetermined level, sense amplifier 28 provides an error or malfunction indication at 29. This indication may also be in the form of a correction signal which acts to correct for the particular malfunction.

The functional checking arrangement as described provides an error or malfunction indication before recording of information takes place on record medium 18. It preferably occurs during the film pulldown time. The checking arrangement indicates the occurrence of any loss of power in laser 10, an error in the operation of modulator 13 and if any of the drive circuits for light deflector 16 have failed. For example, if it is assumed that one of the drive circuits 17 for a light deflector stage has failed and the optical channel is switched into an all "1"s condition for checking, some light is deflected out of the channel as beam 26. Detector 27 provides an electrical signal indicative of a lower level of light than normal circumstances. Sense amplifier 28 responds to this electrical signal and performs a comparison with the predetermined level and provides the error indication at 29.

Figures 2, 3:
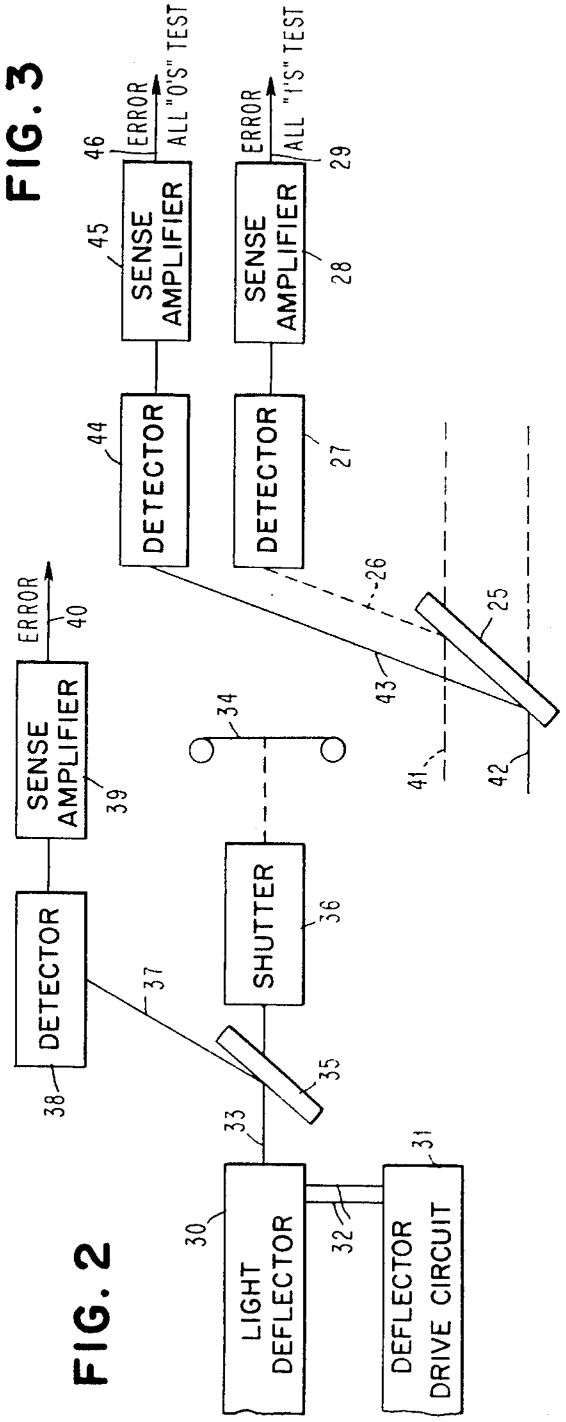
FIG. 2 is a schematic diagram of a modified form of the functional checking apparatus according to the invention; and, FIG. 3 is a schematic diagram of the checking apparatus employed for isolating any malfunctions in the light beam deflection arrangement.

An alternate checking control arrangement is provided in FIG. 2. Light deflector 30 is responsive to the drive circuits 31 through the lines 32. Normally beam 33 provided from light deflector 31 is directed to a particular discrete location on record medium 34. In place of the optical control 23 and the birefringent device 25 of FIG. 1, this arrangement employs a beam splitter 35 followed by a shutter 36 in the light path to record medium 34.

Beam splitter 35 deflects a portion of light beam 33 out of the optical channel as beam 37. Detector 38 responds to beam 37 to provide an indication to sense amplifier 39 as to the intensity level of beam 37. As only a portion of the available light is deflected out of the optical channel for detection, sense amplifier 39 is adjusted to a predetermined lower level of intensity than the sense amplifier 28 of FIG. 1. If this predetermined level is not met by the deflected beam 37 an error indication is provided at 40.

Shutter 36 may be a mechanical shutter to prevent the passage of the remaining portion of beam 33 to record medium 34. It may also be an electro-optic device acting as a modulator such as the modulator 13 of FIG. 1.

To isolate the locations of a malfunction to the deflector drive circuits when an error indication has been provided as a result of the all "1"s test, modulator 13 and checking control device 23 are maintained in an activated or "1"s state. All of the drive circuits 17 for light deflector 16 are deactivated to an all "0"s condition. As shown in FIG. 3, instead of the light beam provided to birefringent device 25 following path 41 it follows the path 42 and is deflected as beam 43 to a second detector 44. Detector 44 provides an indication to sense amplifier 45 for an error indication at 46 if the malfunction is located in the drive circuits for the light deflector.

It is apparent, therefore, that an optical channel operating under electronic controls can be functionally checked by employing a single detecting device and sense amplifier rather than an arrangement corresponding to an array of detectors and amplifiers. It is also apparent that this mode of checking is not restricted to the particular optical record system described in the aforecited copending application of Cobb and Lipp but is applicable to such systems as the electro-optic printer or display described and claimed in Reissue U.S. Pat. No. 26,170.

While the invention has been particularly shown and described with reference to the preferred embodiments thereof, it will be understood by those skilled in the art that the foregoing and other changes in form and details may be made therein without departing from the spirit and scope of the invention.

What I claim is:

1. A method of functionally checking the elements of an optical channel of a beam-recording system when said system is in the nonrecording mode of operation, comprising the steps of projecting a light beam of predetermined intensity and linear polarization state through said channel, orienting the polarization state of the projected beam to a desired linear polarization state, directing all of said beam from said channel in response to said desired polarization state when the elements of said channel are in a predetermined state of operation, and monitoring the intensity level of said directed beam to provide an indication of a malfunction in said channel when the level of said intensity deviates from a predetermined level.

2. In the method of claim 1, wherein the optical channel includes beam-positioning means and an indication of a malfunction has been provided, the further steps of operating all elements of said channel except said beam positioning means in said predetermined state of operation and said beam-positioning means in a second predetermined state of operation after the malfunction indication is provided, and monitoring the intensity level of said directed beam to provide a second malfunction indication when the level of said intensity deviates from said predetermined level, whereby the presence of a malfunction is isolated to said beam-positioning means.

3. In an optical beam-projecting system having an optical channel including linearly polarized light beam generating means of predetermined intensity, an output medium and means acting on the polarization state of the beam for positioning it at any one of a plurality of discrete locations on said medium, the improvement comprising means positioned in the path of said beam between the positioning means and the output medium for deflecting all of said beam out of said channel and inhibiting the positioning of said beam on said medium when the generating means and positioning means are in a predetermined state of activation, said beam-deflecting means having in the order of the beam provided by the positioning means, means for orienting the linear polarization state of said beam into one of two mutually orthogonal linear polarization states, and birefringent means for providing said beam to the output medium when the beam has one of the polarization states and for providing the deflected beam from said channel when the beam from the orienting means has the orthogonal polarization state, and means outside of said channel responsive to the deflected beam for monitoring the intensity of said beam to provide an indication of any malfunction in said beam generating means and positioning means of said channel when the level of said intensity deviates from a predetermined level.

4. In the optical beam-projecting system of claim 3, wherein the system further comprises second monitoring means outside of said channel sequentially operative after the first monitoring means indicates a malfunction and when said beam positioning means is operated according to a second predetermined state of activation for monitoring the intensity of said deflected beam to provide an indication of a malfunction in said beam-positioning means.